(12) United States Patent
Kim et al.

(10) Patent No.: US 7,881,911 B2
(45) Date of Patent: Feb. 1, 2011

(54) 4-D INVERSION OF GEOPHYSICAL DATA AND 4-D IMAGING METHOD OF GEOLOGICAL STRUCTURE USING IT

(75) Inventors: Jung-Ho Kim, Daejeon (KR); Myeong-Jong Yi, Daejeon (KR)

(73) Assignee: Korea Institute of Geoscience & Mineral Resources, Daejeon (KR)

( * ) Notice: Subject to any disclaimer, the term of this patent is extended or adjusted under 35 U.S.C. 154(b) by 748 days.

(21) Appl. No.: 11/722,715

(22) PCT Filed: Dec. 27, 2006

(86) PCT No.: PCT/KR2006/005758
§ 371 (c)(1),
(2), (4) Date: Jun. 25, 2007

(87) PCT Pub. No.: WO2008/069364
PCT Pub. Date: Jun. 12, 2008

(65) Prior Publication Data
US 2009/0198476 A1    Aug. 6, 2009

(30) Foreign Application Priority Data
Dec. 8, 2006   (KR) ................ 10-2006-0124890

(51) Int. Cl.
*G06F 7/60* (2006.01)
*G06G 7/48* (2006.01)
*G01V 1/00* (2006.01)

(52) U.S. Cl. ................ 703/2; 703/10; 367/25

(58) Field of Classification Search ............ 703/9, 703/10, 2; 367/21, 25
See application file for complete search history.

(56) References Cited

U.S. PATENT DOCUMENTS

| | | | |
|---|---|---|---|
| 5,798,982 A * | 8/1998 | He et al. | 367/73 |
| 6,438,069 B1 * | 8/2002 | Ross et al. | 367/73 |
| 6,556,922 B2 * | 4/2003 | Anno | 702/17 |
| 6,836,448 B2 * | 12/2004 | Robertsson et al. | 367/59 |

* cited by examiner

*Primary Examiner*—Paul L Rodriguez
*Assistant Examiner*—Eunhee Kim
(74) *Attorney, Agent, or Firm*—Mark M. Friedman

(57) ABSTRACT

The method for 4-D inversion of geophysical data for calculating distribution of subsurface material properties from geophysical data includes (a) defining measured data into space-time coordinates, and defining a reference space-time model vector (U) composed of many reference space model vectors (U) for a plurality of pre-selected reference times to simulate a space-time model vector (P) that is a geologic structure continuously changing in time; (b) approximating a numerical modeling for a geologic structure space model at an arbitrary time using Taylor series of numerical modeling for the reference space models, defining an objective inversion function to constrain each inversion in space and time domains, and obtaining a reference space-time model vector (U) from the measured data defined in space-time coordinates using the objective inversion function; and (c) obtaining a space-time model vector (P) from the reference space-time model vector (U) to calculate distribution of subsurface material properties changing in time.

7 Claims, 4 Drawing Sheets

(a) $t = 0$  (b) $t = 0.2$  (c) $t = 0.4$ (d) $t = 0.6$  (e) $t = 0.8$  (f) $t = 1.0$

4-D INVERSION OF GEOPHYSICAL DATA AND 4-D IMAGING METHOD OF GEOLOGICAL STRUCTURE USING IT

TECHNICAL FIELD

The present invention relates to 4-D inversion of geophysical data and a 4-D imaging method of geologic structure using it, and more particularly to a new 4-D inversion and an imaging method using it, which obtains the distribution of subsurface material properties in the space-time domain using just one inversion for monitoring data at different times so as to obtain information related to geologic structure changing in time.

Geophysical monitoring advantageously allows obtaining 2-D or 3-D space image of an examination area, not information of one point. Due to this reason, the geophysical monitoring conducting many investigations in the same region with changing measurement times is more frequently used to understand the change of geologic structure changing in time. The geophysical monitoring is applicable to very wide fields such as monitoring the change of foundation of an important structure, monitoring dispersion of pollution, monitoring the subsurface disaster, determining the foundation improvement, and deriving hydrogeological material properties such as passage of underground water, hydraulic conductivity, permeability and porosity.

BACKGROUND ART

In a common analysis of monitoring data, survey data obtained at different times are independently inverted to obtain images of each time, and then the images are compared with each other to interpret and monitor the change of foundation along with time. However, in most cases, this approach has high probability of erroneous analysis due to inversion artifacts since the subsurface material properties are not greatly changed.

FIG. 1 is a concept view showing a conventional inversion for imaging geologic structure changing in time.

In the conventional inversion, monitoring data were separately handled to realize subsurface images, so it is impossible to refer to geologic structure changing at different times. Thus, the subsurface images may be seriously distorted, and the distortion appearing in the images of changing geologic structure gets worse. In addition, since each monitoring data and subsurface space are analyzed just in a space concept, it is impossible to consider the change of geologic structure that may happen while measuring the monitoring data.

In order to prevent the above problems, an inversion method for inverting monitoring data by adopting an inversion result of initial data as a prior model or reference model (Locke, 1999; Labrecque and Yang, 2002) has been suggested. However, this method is not different from the conventional inversion in the point that conversion for monitoring data are independently conducted, and also it is apparent that the entire image while the monitoring period is very highly dependent on the initial model.

Meanwhile, the most basic assumption commonly used in the inversion for imaging geologic structure is that the geologic structure is not changed while the data is monitored. However, in case of brine injection experiments on a soil layer having very high permeability or the like, fluid with very high electric conductivity migrates fast, so the above assumption for the static subsurface model can be hardly accepted. In this case, if the factor that the geologic structure changes while obtaining data is not included in the inversion, the subsurface image obtained by the inversion will be severely distorted as apparently understood. In spite of that, most of studies and techniques developed so far are based on the assumption that geologic structure is not changed.

Meanwhile, Day-Lewis et al. (2002) has developed an effective inversion for crosshole radar tomography monitoring data obtained from the geologic structure changing in time while obtaining the data. However, this inversion is applicable only for travel time tomography that uses a travel time of wave, and it is substantially impossible to expand it to inversion of physical survey data.

DISCLOSURE

Technical Problem

In order to solve the above problems, the present invention is directed to providing a new 4-D inversion capable of: i) obtaining a subsurface image of far higher reliability than conventional ones by inverting a plurality of monitoring data; and ii) calculating a subsurface image continuously changing in time using only one measured data as well as a plurality of iterative measured data.

Technical Solution

In order to accomplish the above object, the present invention provides the method for 4-D inversion of geophysical data for calculating distribution of subsurface material properties from geophysical data, which includes (a) defining measured data in space-time coordinates, and defining a reference space-time model vector (U) composed of a plurality of reference space model vectors (U) for a plurality of pre-selected reference times so as to simulate a space-time model vector (P) that is a geologic structure continuously changing in time; (b) approximating a numerical modeling for a geologic structure space model at an arbitrary time using Taylor series of a numerical modeling for the plurality of reference space models, defining an objective inversion function to constrain each inversion in space and time domains, and obtaining a reference space-time model vector (U) from the measured data defined in space-time coordinates using the objective inversion function; and (c) obtaining a space-time model vector (P) from the reference space-time model vector (U) to calculate distribution of subsurface material properties changing in time.

Using the 4-D inversion of the present invention, it is possible to realize reliable subsurface images even when the change of geologic structure happening during data collection cannot be ignored.

While measurement data were defined only in space coordinates in the conventional inversion, the measurement data are defined in space and time coordinates, namely 4-D coordinates, in the 4-D inversion of the present invention.

The method for 4-D inversion of the present invention is conducted based on the assumption that subsurface material properties are linearly changed in time. Thus, a space vector $p^{(t)}$ at an arbitrary time t is defined using reference space model vector u at a pre-selected reference time as in the following equation, and thus the space-time geologic structure model continuously changing in time may be simulated into several reference space models.

$$p(t) = u_k + (t - \tau_k) v_k \quad \text{[Equation]}$$

Here, $$v_k = \frac{du}{dt},$$

and τ is a pre-selected reference time.

In addition, in the step (b), numerical modeling G(t) for the geologic structure space model at an arbitrary time $\tau_k \leq t \leq \tau_{k+1}$ is conducted in a way of approximating by using the first order Taylor series expansion of the following equation for the numerical modeling of reference space models at two reference times ($\tau_k$, $\tau_{k+1}$).

$$G(t) = \frac{\tau_{k+1} - t}{\tau_{k+1} - \tau_k}\{F(u_k) + (t - \tau_k)J_k v_k\} + \frac{t - \tau_k}{\tau_{k+1} - \tau_k}\{F(u_{k+1}) + (t - \tau_{k+1})J_{k+1}v_k\}$$ [Equation]

Here, $F(u_k)$ is numerical modeling for the reference space model $u_k$, and $J_k$ is partial derivatives of a model response with respect to the reference space model.

Using the steps (a) and (b), the subsurface model in space and time domains continuously changing in time is approximated into a plurality of reference space models, and the problem of numerical modeling for numerous space models requiring a lot of calculation is also solved in a way of approximation conducted by the modeling based on reference space models.

Inversion is defined using an objective function to be minimized during the iterative inversion process, and the 4-D inversion of the present invention is also defined using the objective function of the step (b). The objective function of the 4-D inversion of the present invention is composed of three terms; an error between measured data and simulated data for a space-time model, a constraint regarding a space domain, and a constraint regarding a time domain. The constraint regarding space domain employs a smoothing constraint that geologic structure is smoothly changed in aspect of space. One of essential features of the 4-D inversion of the present invention is to introduce a constraint for time domain to the inversion, and for the newly introduced time domain, it is preferred to introduce a constraint that there is no great change between two reference space models adjacent to each other in aspect of time. This objective function of 4-D inversion is defined using the following equation.

$$\Phi = \|e\|^2 + \lambda \Psi + \alpha \Gamma$$ [Equation]

where, $$e' = d - G(U + \Delta U),$$
$$\Psi = (\partial^n \Delta U)^T (\partial^n \Delta U),$$
$$\Gamma = \sum_{i=1}^{m-1} \|(u_k + \Delta u_k) - (u_{k+1} + \Delta u_{k+1})\|^2$$
$$= \{M(U + \Delta U)\}^T M(U + \Delta U),$$

$\Psi$ is an inversion constraint function in a space domain, $\Gamma$ is an inversion constraint function in a time domain, $\lambda$ and $\alpha$ are Lagrangian multipliers for controlling the degree of constraints, d is a measured data vector, G is a numerical modeling result or a numerical simulation result for a given geologic structure, U is a reference space-time model vector composed of a plurality of reference space model vectors (u), and M is a square matrix where diagonal and one sub-diagonal elements have value 1 or −1.

In addition, in order to accomplish the above object, there is also provided a method for 4-D imaging, which further includes the step of imaging geologic structure changing in time, based on the distribution of subsurface material properties obtained by the above 4-D inversion.

Advantageous Effects

According to the present invention described above, it is possible to provide a new 4-D inversion and an imaging method using it, which allows to accurately calculate geologic structure changing in time by inverting a plurality of monitoring data at the same time, and provide reliable images even when the geologic structure changes fast during data collection, using even only one measurement data, not a plurality of iterative measurement data.

BEST MODE

Hereinafter, 4-D inversion of geophysical data and a 4-D imaging method of geologic structure using it according to one embodiment of the present invention will be explained in detail with reference to the accompanying drawings.

The present invention is not limited to the following embodiments, but may be implemented in various ways. The embodiments proposed herein are rather for illustrating the spirit of the invention more sufficiently for better understanding.

Figure 2:
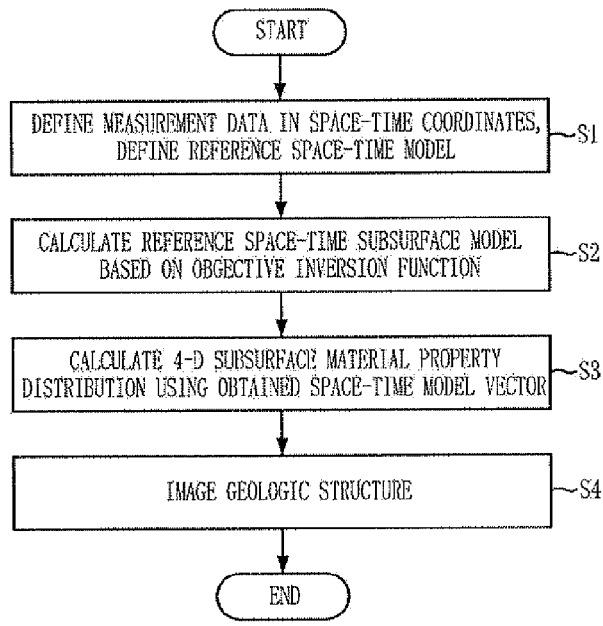
FIG. 2 is a flowchart illustrating a 4-D inversion and an imaging method using it according to one embodiment of the present invention.

FIG. 2 is a flowchart illustrating 4-D inversion and an imaging method using it according to one embodiment of the present invention.

The present invention relates to the inversion for calculating distribution of subsurface material properties from geophysical data and an imaging method using it, which includes:

(a) defining measured data into space-time coordinates, and defining a reference space-time model vector (P) and a reference space-time model vector (U) for a plurality of pre-selected reference times so as to determine a space-time model (S1);

(b) approximating a numerical modeling for a geologic structure space model at an arbitrary time using Taylor series of a numerical modeling for the plurality of reference space models, defining an objective inversion function to give constraints in both space and time domains, and obtaining a reference space-time model vector (U) from the measured data defined in space-time coordinates using the objective inversion function;

(c) obtaining a space-time model vector (P) from the reference space-time model vector (U) to calculate distribution of subsurface material properties in the space-time domain; and (d) imaging geologic structure changing in time, based on the distribution of subsurface material properties.

The present invention provides a new 4-D inversion capable of inverting a plurality of monitoring data at the same time, and also providing reliable images using not only a plurality of iterative measured data but also only one measured data though subsurface structure is rapidly changed even during the measurement.

For this purpose, the present invention assumes the subsurface structure as a model that is continuously changed in time, and thus the subsurface structure is defined in a space-time model, not a space model. Measured data are also defined as space-time coordinates, not space coordinates.

If a subsurface space-time model is sampled into a plurality space models at regular time intervals, the subsurface structure will be composed of numerous space models, so it is substantially impossible to invert the entire models. As a practical approach to this problem, subsurface space models for pre-selected several reference times (hereinafter, referred to as 'reference space model') are set, and it is assumed that material properties at the same space coordinates are linearly changed in time.

In addition, since numerical modeling for numerous space models also require a lot of calculation, the numerical modeling with respect to a subsurface structure at an arbitrary time is approximated using the first order Tayler series of the numerical modeling based on the reference space model.

Using the above assumption and approximation, the question of obtaining a space-time model of geologic structure continuously changing in time comes to calculating several reference models.

Hereinafter, variables and numerical modeling of geologic structure related to the 4-D inversion according to the present invention will be explained.

If geologic structure continuously changing in time is sampled at regular intervals, the geologic structure will be defined as the following space-time vector (P).

$$P=\{p_1,\ldots,p_i,\ldots,p_n\}$$

Here, $p_i$ is a space model vector with respect to time i. Since the space-time vector P is composed of numerous space models $p_i$, a new reference space-time model composed of reference space model vectors $u_k$ with respect to the m (m<<n) number of pre-selected times $\tau_k$ as follows is defined.

$$U=\{u_1,\ldots,u_k,\ldots,u_m\}$$

Assuming that subsurface material properties at the same space coordinates are linearly changed, the change vector of property change generated between two times $\tau_k$ and $\tau_{k+1}$ may be defined as in the following Equation 1 (Math FIG. 1).

$$v_k = \frac{du}{dt} = \frac{u_{k+1} - u_k}{\tau_{k+1} - \tau_k} \quad \text{(Math Figure 1)}$$

Using the Equation 1, a subsurface space vector at an arbitrary time t may be defined as in the Equation 2 (Math FIG. 2).

$$p(t)=u_k+(t-\tau_k)v_k \quad \text{[Math FIG. 2]}$$

Though the number of space-domain subsurface space models is reduced using the above assumption, principally, numerical modeling for calculating the response of geologic structure according to time should be calculated based on a plurality of subsurface space models. However, it needs a very long calculation time.

In order to solve this problem, the numerical modeling for geologic structure at an arbitrary time $\tau_k \leq t \leq \tau_{k+1}$ is approximated using the first order Tayler series expansion of $F(u_k)$, $F(u_{k+1})$ that are results of numerical modeling at both reference times, and then it is used for inversion.

$$G(t) = \frac{\tau_{k+1} - t}{\tau_{k+1} - \tau_k}\{F(u_k) + (t-\tau_k)J_k v_k\} + \quad \text{(Math Figure 3)}$$

$$\frac{t - \tau_k}{\tau_{k+1} - \tau_k}\{F(u_{k+1}) + (t-\tau_{k+1})J_{k+1} v_k\}$$

Here, $J_k$ is partial derivatives of the model response with respect to the reference space model $u_k$, namely Jacobian matrix.

Adopting the above assumption and approximation, the inversion for finding 4-D geologic structure over the entire space and time will be simplified into a question for obtaining several reference space model vectors (u).

Hereinafter, a least-squares inversion related to the 4-D inversion according to the present invention will be explained in detail.

Figure 4:
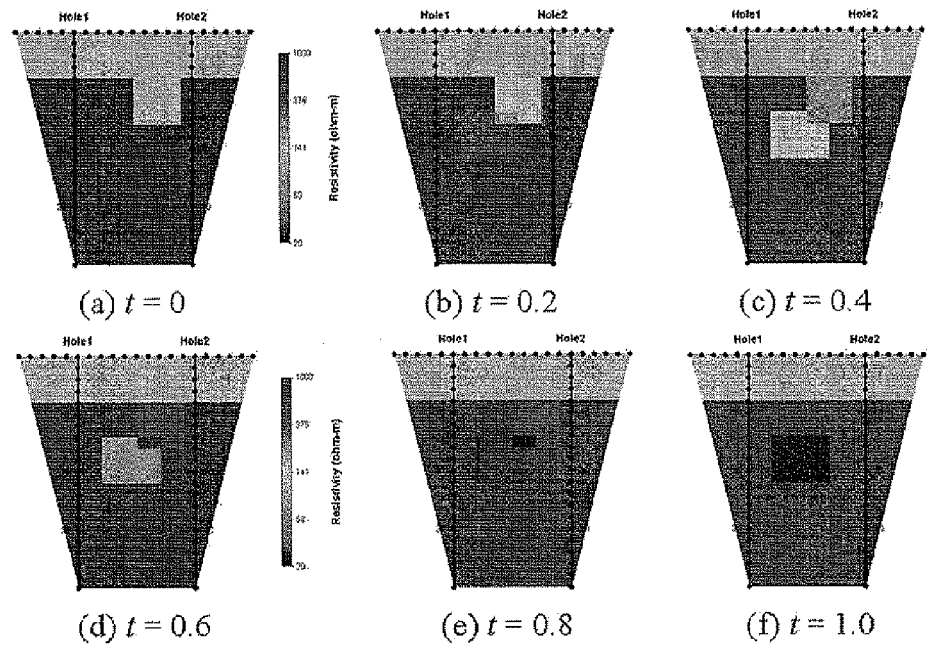
FIG. 4 shows snap images of a changing subsurface space, set for the 4-D inversion experiment, taken at different times according to one embodiment of the present invention.
Figure 5:
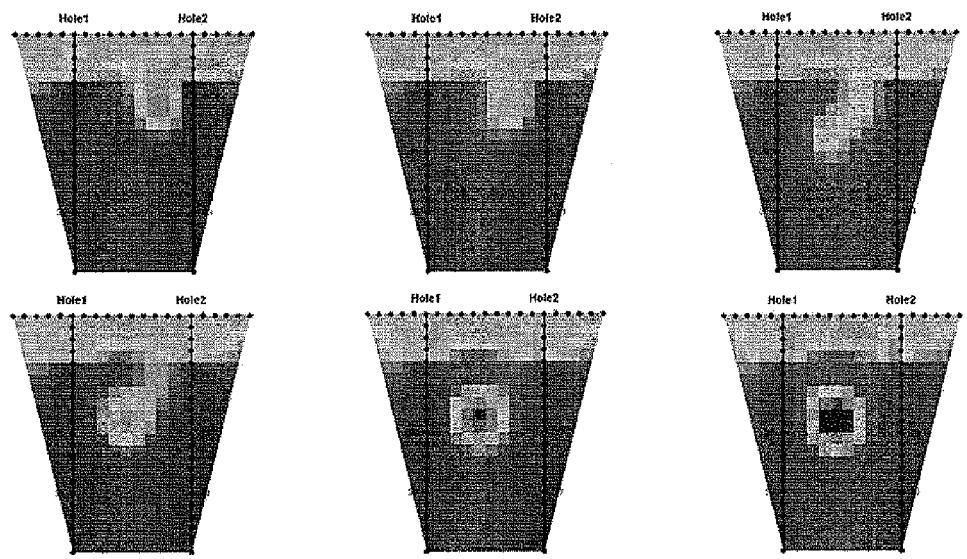
FIGS. 5 and 6 show snap images of a changing subsurface image, taken at different times based on the experiment results using the 4-D inversion according to one embodiment of the present invention.

An error vector e that is a difference between the measured data vector d and simulation data obtained by the reference space-time model, namely its data vector, is defined as in the Equation 4 (Math FIG. 4). In addition, an estimated error vector e' that is a difference between a theory data vector obtained by the reference space-time model to be optimized and calculated in the future and the measured data vector is defined as in the Equation 5 (Math FIG. 5). The inversion comes to a question of calculating an increment vector $\Delta U$ of the reference space-time model so as to minimize the estimated error vector.

$$e=d-G(U) \quad \text{[Math FIG. 4]}$$

$$e'=d-G(U+\Delta U) \quad \text{[Math FIG. 5]}$$

Figure 6:
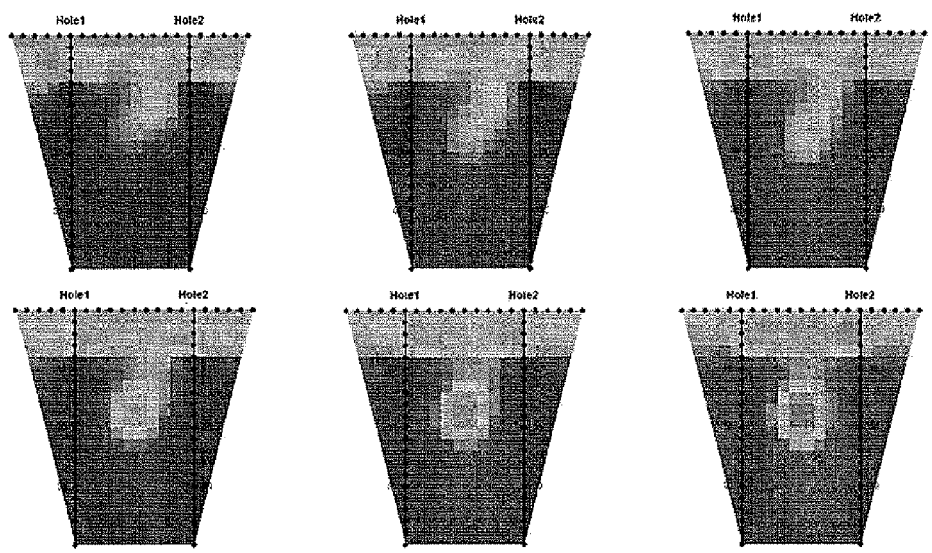

The inversion of geophysics can be characterized in non-uniqueness and ill-posedness of solution, and thus it has serious instability such as divergence. To solve this problem, constraints are commonly applied to the inversion. In the present invention, a constraint of time domain is additionally introduced in addition to the constraint of space domain that is an inversion constraint commonly adopted to develop an inversion algorithm of geologic structure in space-time domain. The constraint of time domain is allowed since definition of the subsurface model is expanded to space-time domain in the present invention. The 4-D inversion of the present invention is based on the least-squares inversion that minimizes squares of error and gives constraints in space-time domain, so it is defined as a question of minimizing an objective inversion function $\Phi$ expressed in the Equation 6 (Math FIG. 6).

$$\Phi=\|e'\|^2+\lambda\Psi+\alpha\Gamma \quad \text{[Math FIG. 6]}$$

Here, $\Psi$ is an inversion constraint function in space domain, $\Gamma$ is an inversion constraint function in time domain, and $\lambda$ and $\alpha$ are Lagrangian multipliers for controlling the degree of constraints.

A smooth constraint is introduced as the constraint of space domain, and an assumption that there is no serious change between two reference space models $u_k$ and $u_{k+1}$ adjacent in aspect of time is introduced as the constraint of time domain. Such constraints are expressed as the Equations 7 and 8 (Math FIGS. 7 and 8) as follows.

$$\Psi=(\partial^n \Delta U)^T(\partial^n \Delta U) \quad \text{[Math FIG. 7]}$$

$$\Gamma = \sum_{i=1}^{m-1} \|(u_k + \Delta u_k) - (u_{k+1} + \Delta u_{k+1})\|^2 \quad \text{(Math Figure 8)}$$

$$= \{M(U + \Delta U)\}^T M(U + \Delta U)$$

Here, M is a square matrix where diagonal elements and one sub-diagonal element respectively have value 1 or −1.

If the objective inversion function of the Equation 6 is differentiated with respect to a reference space-time increment vector $\Delta U$, a solution for the reference space-time increment vector $\Delta U$ as in the Equation 9 (Math FIG. 9) may be obtained.

$$\Delta U = (A^T W_d A + C^T \Lambda C + \alpha M^T M)^{-1}(A^T W_d e - \alpha M^T M U) \quad \text{[Math FIG. 9]}$$

Here, $W_d$ is a data weighting matrix, A is a partial derivative matrix with respect to the reference space-time model U composed of reference space model vectors, and C is a smoothing constraint operator in space domain. In case of the constraint of space domain, ACB (Active Constraint Balancing) proposed by Yi et al., 2003, is introduced, so Lagrangian multipliers for controlling the constraint of space domain are defined as a diagonal matrix A. By solving the Equation 9 iteratively until the error between the theory data and the measured data reaches an allowable limit, a desired geologic structure space-time model can be obtained.

Figure 1:
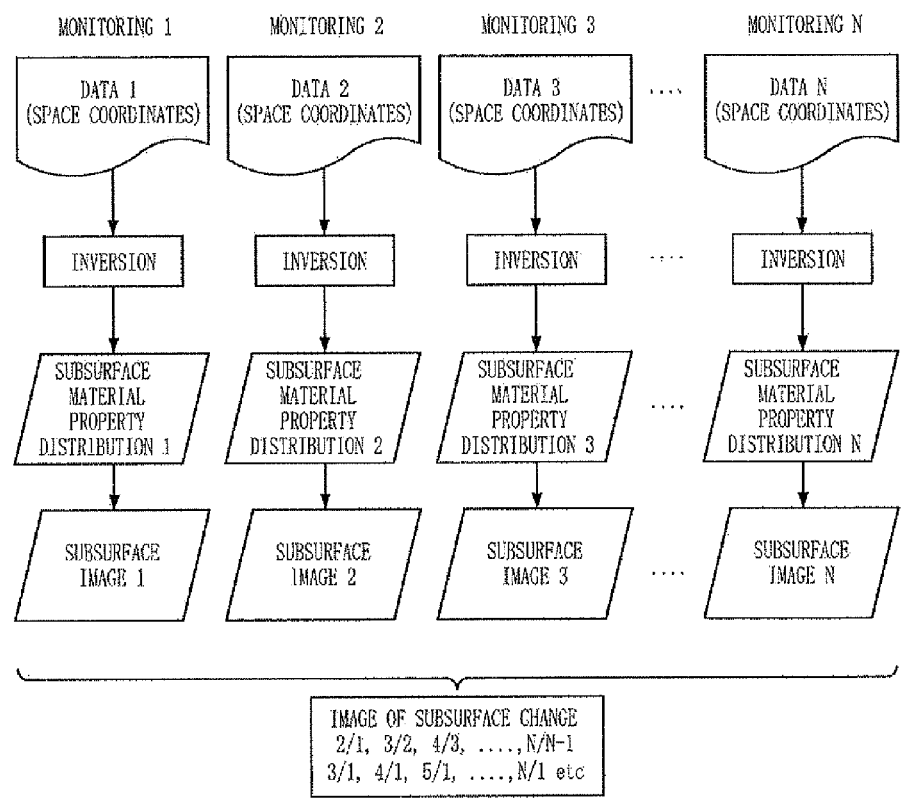
FIG. 1 is a concept view showing a conventional inversion for imaging geologic structure changing in time.
Figure 3:
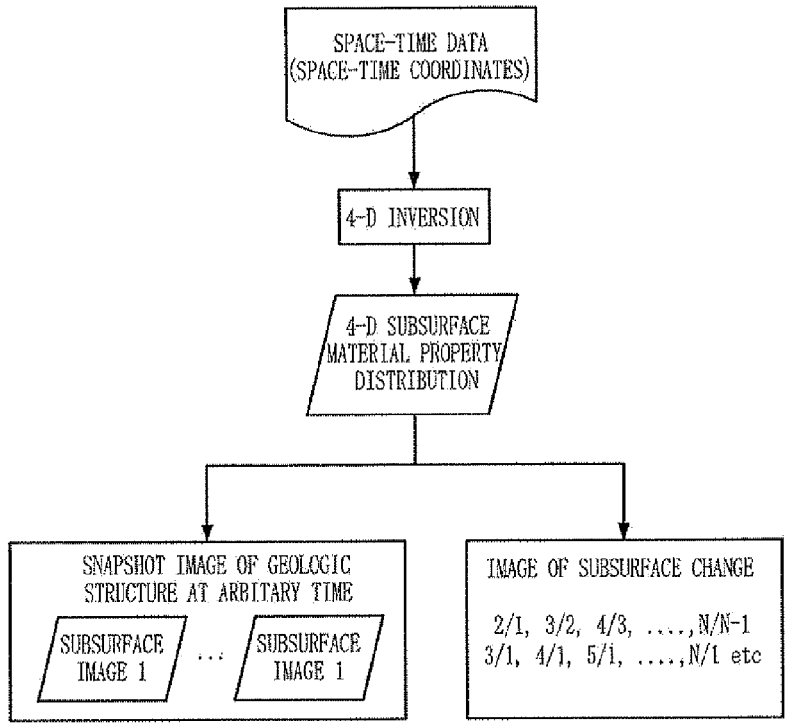
FIG. 3 is a concept view showing a 4-D inversion according to one embodiment of the present invention.

FIGS. 1 and 3 are concept views showing the conventional inversion and a new inversion of the present invention, respectively.

In the conventional inversion, monitoring data are separately inverted to realize subsurface images, so it is impossible to refer to changed geologic structures at different times. Thus, there is high possibility of distortion of the subsurface images, and the image of subsurface change is particularly distorted more seriously. In addition, since each of monitoring data and subsurface space is analyzed only in a space aspect, it is impossible to consider the change of geologic structure that may happen during the measurement of monitored data. On the contrary, the 4-D inversion of the present invention analyzes measured data and geologic structure in both space and time concept, defined into one kind of space-time domain data and one space-time model, so a space-time subsurface model may be obtained using one inversion. Due to this reason, geologic structure changing at different times may be referred to during the inversion process. In addition, it is possible to calculate geologic structure changing in time by using just one data set.

An optimal embodiment has been illustrated in the drawings and specification. Though specific terms have been used therein, they are for illustration purpose only and not intended to limit the scope of the invention defined in the appended claims. Therefore, those having ordinary skill in the art would understand that various modifications and equivalents may be made therefrom. So, the scope of the present invention should be defined based on the spirit of the appended claims.

MODE FOR INVENTION

Hereinafter, inversion experiments to verify effectiveness of the 4-D inversion and the imaging method using it according to the present invention will be explained.

The inversion experiments were conducted using non-conductive tomography numerical modeling data, pole-dipole array being adopted as an electrode array, the space-time model being sampled into 30 space models (n=30) continuously changing. Numerical modeling was conducted for all of 30 models, and one data set is configured from the data of 30 sets. It is apparent that experiments will be much more difficult in case only one data set exists rather than in case a plurality of iterative measured monitoring data exist, when geologic structure changes severely as above. This experiment was conducted under the assumption that only one data set is obtained.

One data set is composed of 1) crosshole, 2) inline, and 3) hole-to-surface surveys.

FIG. 4 shows snapshots of the model change of subsurface space set for the inversion experiments, taken at each time. The time t is normalized by the total measurement period.

In the present invention, all data are defined in space-time coordinates, and numerous space models are obtained from only one measurement data set, so the sequence of data measurement will be very important.

FIG. 5 shows snapshots of the model change of subsurface space at each time according to the first inversion experiment results.

The inversion experiment shown in FIG. 5 is the inverted results, when data measurement was performed randomly, and thus the data obtained by each measurement contain the responses to all the 30 space models. The number of reference models in space domain set to the inversion is only two, and the corresponding pre-selected times are respectively $\tau=0.17$ and $\tau=0.83$. Though there are only two reference space models and only one data set exists, the inverted results well show the figure that a zone with high electric conductivity migrates together with the fact that geologic structure changes in time.

FIG. 6 are snapshots of the model change of subsurface space at each time according to the second inversion experiment results.

Differently from FIG. 5 in which measurement was performed randomly, this inversion experiment was conducted based on data configured supposing that measurement is done in the sequence of 1) crosshole, 2) inline, and 3) hole-to-surface surveys.

Since the crosshole survey is conducted at an early stage, the responses of the early time model (see (a) and (b) of FIG. 4) are dominant in the crosshole survey data. Meanwhile, since the hole-to-surface survey is conducted at a late stage, the responses of the late time model are dominant in the late time model (see (e) and (f) of FIG. 4).

Thus, since geologic structures are different depending on the surveys, it is easily expected that this inversion is significantly difficult in comparison to the case of FIG. 5. FIG. 6 does not show the clear snapshot images in comparison to FIG. 5, but FIG. 6 still shows reasonable images by which it may be recognized that the geologic structure is changed during the data collection and the conductive zone migrates.

In order to examine the influence caused when the number of reference space models changes, the number of reference space models was set to 3, and then the experiment data used in the calculation of FIG. 6 was inverted again. However, the results were substantially identical to those of FIG. 6. Thus, it would be understood that reference space models taken at just two or three times are sufficient in order to image the change model of geologic structure continuously changing in time.

In this case, in case of extracting subsurface images using the conventional inversion, only one data set exists, which allows to obtain only one still subsurface image Thus, it is impossible to extract the change of geologic structure and also images are seriously distorted.

As described above, the present invention provides a new 4-D inversion of geophysical data and an imaging method using it, which enables to invert a plurality of monitoring data at the same time and also to configure reliable subsurface images even when the change of geologic structure during data collection cannot be ignored.

By using the inversion of the present invention based on just one-time measurement data by means of the crosshole non-conductive tomography survey numerical experiments, it is proved that a subsurface image continuously changing in time can be obtained.

Though the embodiments of the present invention have been explained on the non-conductive surveys, the 4-D inversion of the present invention may also be applied to other kinds of physical data such as electron surveys, gravity surveys, radar, elastic wave tomography and so on, since the 4-D inversion of the present invention has only generalized concepts such as numerical modeling and data measurement.

INDUSTRIAL APPLICABILITY

The present invention explained above in detail may be used for a new 4-D inversion of geophysical data and a 4-D imaging method of geologic structure using it. In more detail, the present invention may be used for a new 4-D inversion and an imaging method using it, which allows to accurately calculate geologic structure changing in time by inverting a plurality of monitoring data at the same time, and to provide reliable images even the geologic structure changes fast during data collection, using only one measurement data, not a plurality of iterative measurement data.

The invention claimed is:

1. A non-transient computer-readable storage medium having computer-readable code, embodied on the computer-readable storage medium, for 4-D inversion of geophysical data for calculating distribution of subsurface material properties from geophysical data, the computer-readable code comprising program code for:
   (a) defining a geological structure continuously changing in time as a space-time model, defining measured data in space and time coordinates, and defining a reference space-time model vector (U) defined by Equation 2 and composed of a plurality of reference space model vectors (u) for a plurality of pre-selected reference times between start time and termination time for obtaining data so as to simulate a space-time model vector (P) defined by Equation 1;
   (b) approximating a numerical model for a geological structure space model at an arbitrary time using Taylor series of a numerical modeling for the plurality of reference space models, defining an objective inversion function to constrain each inversion in space and time domains, and obtaining the reference space-time model vector (U) from the measured data defined in space and time coordinates using the objective inversion function; and
   (c) obtaining the space-time model vector (P) from the reference space-time model vector (U) to calculate distribution of subsurface material properties changing in time;

$$P=\{p_1, \ldots, p_i, \ldots, p_n\}, \qquad \text{Equation 1}$$

where $p_i$ is a space model vector with respect to time i;

$$U=\{u_1, \ldots, u_i, \ldots, u_n\}, \qquad \text{Equation 2}$$

where $u_k$ is a reference space model vector with respect to the in (m<<n) number of pre-selected times $\tau_k$.

2. The storage medium according to claim 1, wherein the 4-D inversion is conducted based on an assumption that subsurface material properties are linearly changed in time.

3. The storage medium according to claim 1, wherein a space vector (p(t)) at an arbitrary time (t) is defined using the following equation:

$$p(t)=u_k+(t-\tau_k)v_k \qquad \text{[Equation]}$$

where u is a reference space model vector, $$v_k = \frac{du}{dt},$$

k is an index number of a reference time($\tau_k$,|), and $\tau$ is a pre-selected reference time.

4. The storage medium according to claim 1, wherein, in the step (b), numerical modeling for the geologic structure space model at an arbitrary time ($\tau_k \leq t \leq \tau_{k+1}$) is conducted in a way of approximating by using the first order Taylor series expansion of the following equation for the numerical modeling of reference space models at two reference times ($\tau^k$, $\tau_{k+1}$):

$$G(t) = \frac{\tau_{k+1} - t}{\tau_{k+1} - \tau_k} \{F(u_k) + (t - \tau_k)J_k v_k\} + \frac{t - \tau_k}{\tau_{k+1} - \tau_k} \{F(u_{k+1}) + (t - \tau_{k+1})J_{k+1} v_k\} \qquad \text{[Equation]}$$

where $F(u_k)$ is numerical modeling for the reference space model ($u_k$), $J_k$ is partial derivatives of a model response with respect to the reference space model, and $$v_k = \frac{du}{dt},$$

wherein k is an index number of a reference time.

5. The storage medium according to claim 1, wherein, in the step (b), wherein the objective inversion function uses a function expressed by the following equation:

$$\Phi = \|e'\|^2 + \lambda\Psi + \alpha\Gamma \qquad \text{[Equation]}$$

where $$e' = d - G(U + \Delta U),$$
$$\Psi = (\partial^n \Delta U)^T (\partial^n \Delta U),$$
$$\Gamma = \sum_{i=1}^{m-1} \|(u_k + \Delta u_k) - (u_{k+1} + \Delta u_{k+1})\|^2$$
$$= \{M(U + \Delta U)\}^T M(U + \Delta U),$$

$\Psi$ is an inversion constraint function in a space domain, $\Gamma$ is an inversion constraint function in a time domain, $\lambda$ and $\alpha$ are Lagrangian multipliers for controlling the degree of constraints, d is a measured data vector, G is a numerical modeling result or a numerical simulation result for a given geologic structure, U is a reference space-time model vector composed of a plurality of reference space model vectors (u), $\Delta U$| is an increment vector of reference space-time model vector, $\partial^n$| is partial derivatives (n times), $\Delta u_k$| is an increment vector of reference space model vector at a reference time $\tau_k$,|, m is a number of reference space model vectors($\Delta u_k$|), n is a number of space model vectors($P_i$|), T is a transposed matrix, k is an index number of a reference time, and M is a square matrix where diagonal and one sub-diagonal elements have value 1 or −1.

6. The storage medium according to claim 1, wherein the objective inversion function introduces constraints for the space domain and constraints for the time domain to the inversion at the same time, and, in the constraints for the time domain, the objective inversion function uses a constraint that two reference space models ($u_k$, $u_{k+1}$) adjacent to each other in aspect of time are not changed, wherein k is an index number of a reference time.

7. The storage medium, further comprising program code for:
   imaging geologic structure changing in time based on the distribution of subsurface material properties obtained by the 4-D inversion defined in claim 1.

* * * * *